(12) United States Patent
Herbeck

(10) Patent No.: US 9,304,571 B2
(45) Date of Patent: Apr. 5, 2016

(54) INTERRUPT BASED POWER STATE MANAGEMENT

(71) Applicant: Apple Inc., Cupertino, CA (US)

(72) Inventor: Gilbert H Herbeck, Livermore, CA (US)

(73) Assignee: Apple Inc., Cupertino, CA (US)

( * ) Notice: Subject to any disclaimer, the term of this patent is extended or adjusted under 35 U.S.C. 154(b) by 267 days.

(21) Appl. No.: 13/861,708

(22) Filed: Apr. 12, 2013

(65) Prior Publication Data

US 2014/0310540 A1 Oct. 16, 2014

(51) Int. Cl.
*G06F 1/26* (2006.01)
*G06F 1/32* (2006.01)

(52) U.S. Cl.
CPC ............ *G06F 1/3206* (2013.01); *G06F 1/3237* (2013.01); *G06F 1/3287* (2013.01); *G06F 1/26* (2013.01)

(58) Field of Classification Search
CPC .................................. G06F 1/3203; G06F 1/26
USPC .................................................. 713/320, 340
See application file for complete search history.

(56) References Cited

U.S. PATENT DOCUMENTS

| | | | | |
|---|---|---|---|---|
| 5,473,757 A | * | 12/1995 | Sexton | ..................... G06F 13/24 700/2 |
| 5,666,537 A | * | 9/1997 | Debnath et al. | ............... 713/322 |
| 6,213,879 B1 | * | 4/2001 | Niizuma | ............... H04L 7/0008 341/50 |
| 8,156,362 B2 | | 4/2012 | Branover et al. | |
| 2001/0032285 A1 | * | 10/2001 | Pawlowski et al. | ............ 710/260 |
| 2007/0016710 A1 | * | 1/2007 | Kimelman | .............. G06F 13/26 710/264 |
| 2007/0260794 A1 | * | 11/2007 | Ashish et al. | .................. 710/267 |
| 2008/0209233 A1 | * | 8/2008 | Kumar et al. | .................. 713/300 |
| 2009/0164817 A1 | * | 6/2009 | Axford et al. | .................. 713/322 |
| 2012/0144081 A1 | | 6/2012 | Smith et al. | |
| 2012/0173782 A1 | * | 7/2012 | Frantz et al. | ................... 710/267 |

OTHER PUBLICATIONS

Joseph Yiu "Definitive Guide to the ARM Cortex-M0" Academic Press, Mar. 1, 2011, p. 1.
"Why Interrupt Handler Should Not Sleep in Linux" Linux discussion board, Nov. 2007, pp. 1-3.

* cited by examiner

*Primary Examiner* — Phil Nguyen
(74) *Attorney, Agent, or Firm* — Meyertons, Hood, Kivlin, Kowert & Goetzel, P.C.; Erik A. Heter

(57) ABSTRACT

A method and apparatus for power managed interrupt handling is disclosed. In one embodiment, a system includes one or more agents that may invoke an interrupt request. An interrupt controller is configured to receive and process the interrupt requests. When idle, the interrupt controller may be placed in a low power state. The system also includes an interrupt power control circuit coupled to receive interrupt request indications from each of the one or more agents that may invoke interrupts. The interrupt power control circuit is configured to assert a wakeup signal responsive to receiving an indication of an interrupt request from one of the agents. If the interrupt controller is in a low power state, it may exit the state and resume operation in an active state responsive to assertion of the wakeup signal.

17 Claims, 8 Drawing Sheets

INTERRUPT BASED POWER STATE MANAGEMENT

BACKGROUND

1. Technical Field

This disclosure is directed to integrated circuits, and more particularly, to power management in integrated circuits in which interrupts may be invoked.

2. Description of the Related Art

In various types of computer systems (e.g., desktop computer systems, tablet computers, smart phones, etc.), circuitry may be included to handle interrupts. Such interrupts are typically invoked by various devices that are peripheral to the interrupt handler. For example, a radio unit in a smart phone may invoke an interrupt responsive to an incoming phone call. Responsive to the interrupt, the interrupt handler may invoke an interrupt handler routine. The interrupt handler routine may cause a processor or other device to perform various functions to deal with the interrupt. It is noted that in many (but not all) cases, the interrupt handler circuitry is part of a processor.

Power management is an important function in various types of computer systems, particularly those that are portable and/or rely on battery power. In such systems, portions that are idle may be placed into a low power state. Low power states may include clock-gating idle functional units and power-gating idle functional units. In some cases, individual functional units within an IC may be placed in a low power state. Peripheral functional units may also be placed in a low power state. Nevertheless, interrupts may occur in systems in which portions thereof are idle. Accordingly, interrupt handling circuitry may be left in a full power state (i.e. receiving both clock and supply voltage) despite other portions of the system being idle.

SUMMARY

A method and apparatus for power managed interrupt handling is disclosed. In one embodiment, a system includes one or more agents that may invoke an interrupt request. An interrupt controller is configured to receive and process the interrupt requests. When idle, the interrupt controller may be placed in a low power state. The system also includes an interrupt power control circuit coupled to receive interrupt request indications from each of the one or more agents that may invoke interrupts. The interrupt power control circuit is configured to assert a wakeup signal responsive to receiving an indication of an interrupt request from one of the agents. If the interrupt controller is in a low power state, it may exit the state and resume operation in an active state responsive to assertion of the wakeup signal.

In one embodiment, a method includes determining that an interrupt controller is inactive (or idle), and responsive thereto, placing the interrupt controller in a low power state. The method further includes one of one or more agent asserting an interrupt request subsequent to placing the interrupt controller in a low power state. An interrupt power controller may receive an indication of the interrupt request responsive to its assertion by the agent. Responsive to receiving the indication, the interrupt power controller may assert a wakeup signal. The interrupt controller may then exit the low power state responsive to assertion of the wakeup signal.

BRIEF DESCRIPTION OF THE DRAWINGS

The following detailed description makes reference to the accompanying drawings, which are now briefly described.

Figure 1:
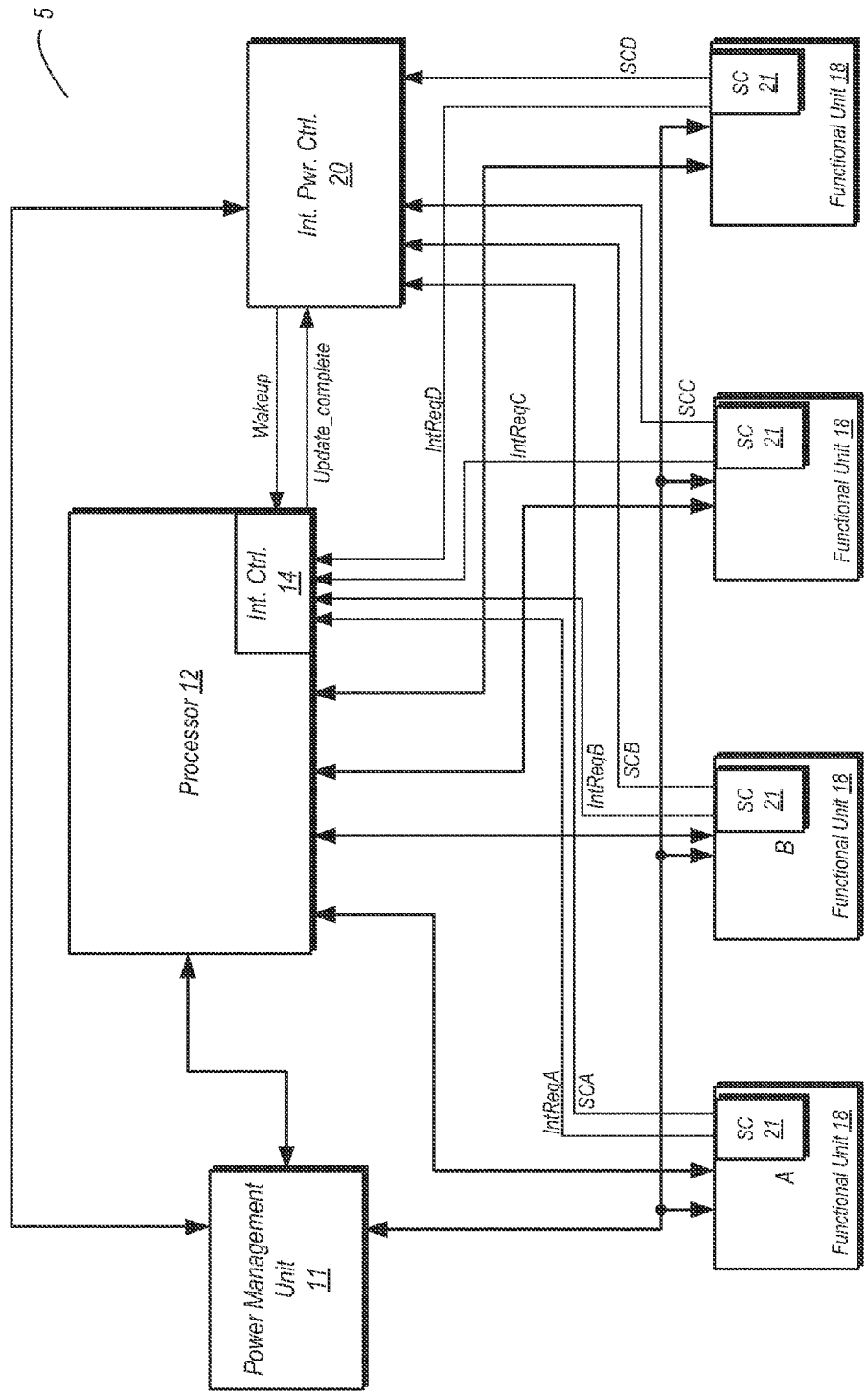
FIG. 1 is a block diagram of one embodiment of a system.

While the invention is susceptible to various modifications and alternative forms, specific embodiments thereof are shown by way of example in the drawings and will herein be described in detail. It should be understood, however, that the drawings and detailed description thereof are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

FIG. 1 is a block diagram of one embodiment of a system. In the embodiment shown, system 5 includes a processor 12, a power management unit 11, a number of functional units 18, and an interrupt power controller 20. In one embodiment, each of the blocks shown in FIG. 1 may be implemented on a single integrated circuit. In other embodiments, one or more of the blocks shown in FIG. 1 may be implemented on an entity separate from that which one or more of the remaining blocks is implemented. It is also noted that in some embodiments, interrupt power controller 20 may be integrated within power management unit 11. In the embodiment shown here, interrupt power controller 20 is implemented separately, but is coupled to communicate with power management unit 11 in order to exchange power status information regarding various functional units.

System 5 may be one of a number of different types of systems. For example, system 5 may be a smart phone, a tablet computer, a desktop or laptop computer, or other type of system.

Processor 12 may be one of a number of different types of processors. In one embodiment, processor 12 may be a single core processor, while in other embodiments, processor 12 may have multiple cores. Processor 12 may in various embodiments be a superscalar processor, and may be implemented using reduced instruction set computing (RISC) technology or complex instruction set computing (CISC) technology. In general, processor 12 may be any type of processor capable of processing data.

System 5 includes a power management unit 11 coupled to processor 12 and each of the functional units 18. In some embodiments, power management unit 11 may be uncoupled from at least some of the functional units 18, which may perform power management functions locally. In this particular embodiment, power management unit 11 may perform power management actions on each of the blocks coupled thereto. Power management actions may include placing a block into a low power state or waking a block from a low power state. A low power state may be defined herein as one or more of a clock gated and or power gated state.

Power management unit 11 may cause clock gating and/or power gating of one of the correspondingly coupled functional units 18. Power management unit 11 may also perform power gating and/or clock gating of processor 12 or portions thereof (e.g., one of a number of cores in a multi-core processor). For the purposes of this disclosure, clock gating may be defined herein as inhibiting a clock signal from being provided to functional unit that receives the clock signal during normal operation. Power gating may be defined herein as removing the supply voltage (and thus the power) from a functional unit.

In some embodiments, power management unit 11 may also monitor activity levels of processor 12 and one or more of functional units 18. Based on the monitored activity levels, power management unit 11 may determine whether a particular block should be clock gated and/or power gated. Power management unit 11 may also determine that a block is to be awakened (i.e. returned to an active state receiving clock and power) from a low power state. In other embodiments, the various blocks shown here may determine when they are to be placed in a low power state and may send power management requests to power management unit 11. If a block is awakened independently of any action by power management unit 11, it may nevertheless send a notification indicating a return to active status.

Each functional unit 18 may be one of a number of different types of circuitry. For example, one of functional units 18 may be a device for supporting communications in a phone or wireless device, another one of functional units 18 may be a graphics processor, while yet a third functional unit 18 may be an input/output (I/O) device. The functional units 18 are each coupled to processor 12 through corresponding interconnections. Although the embodiment illustrated in FIG. 1 shows each of the functional units connected directly to processor 12, embodiments utilizing a communications fabric are also possible and contemplated. Embodiments that utilize a communications fabric may include one or more agents located between a functional unit 18 and processor 12. With respect to the various circuits discussed below with regard to interrupts, it is understood that these circuits may be implemented in an embodiment that utilizes a communications fabric, and various methods for doing so will be apparent to those skilled in the art.

Each of functional units 18 in the embodiment shown is configured to assert interrupt requests, which may be received by interrupt controller 14 of processor 12. It is noted that embodiments of system 5 may include additional functional units that are not configured to assert interrupt requests, although the focus here is on those that are able to do so.

Each functional unit 18 includes a status change circuit 21 ('SC'). Each status change circuit 21 in the embodiment shown is configured to determine whether an interrupt status has changed for its respective functional unit 18. A change of interrupt status may include the assertion of an interrupt request from a non-asserted state, or de-assertion of an interrupt request from an asserted state. Each status change circuit 21 may assert a status change signal (e.g., 'SCA', 'SCB', etc.) indicating a change of interrupt status for that functional unit. Additionally, each functional unit 18 may assert a corresponding interrupt request (e.g., 'IntReqA', 'IntReqB', etc.). The interrupt requests may be received by interrupt controller 14 of processor. Responsive to receiving an interrupt request, interrupt controller 14 may invoke an interrupt handler routine that is executed by processor 12. The interrupt handler routine that is invoked for a particular interrupt may be dependent upon the functional unit 18 that is asserting the interrupt request and/or the nature of the interrupt request.

Interrupt power controller 14 in the embodiment shown may be subject to power management. That is, when determined to be idle, interrupt controller 14 may be placed in a low power state. In one embodiment, interrupt controller 14 may be clock gated if idle for a first amount of time. If the interrupt controller remains idle for a second amount of time subsequent to being clock gated, it may also be power gated.

Since interrupt controller 14 is power manageable, it is possible that an interrupt may occur when it is in a low power state. Accordingly, system 5 includes interrupt power controller 20. In the embodiment shown, interrupt power controller 20 is configured to cause interrupt controller 14 to be awakened from a low power state. More particularly, responsive to receiving an indication of an interrupt request from one of the functional units 18 (via a corresponding status change signal), interrupt power controller 20 may assert wakeup signal ('Wakeup') that, when received by interrupt controller 14, may cause it to exit the low power state. When the servicing of an interrupt is complete, interrupt controller 14 may convey a corresponding indication ('Update_complete') to interrupt power controller 20. Responsive to receiving the indication, interrupt power controller may de-assert the wakeup signal if no other interrupt requests are pending and/or being serviced at that time. Embodiments of a status change circuit 21 and various circuitry within an embodiment of interrupt power controller 20 are now discussed in further detail.

It is further noted that in embodiments in which a communications fabric is implemented, various parts thereof may also be power managed (i.e. capable of being placed in a low power state). In such embodiments, additional circuitry may be included to facilitate the communications of an interrupt request from its source to interrupt controller 14. Thus, in conveying an interrupt request through a communications fabric, additional agents may be awakened from a low power state. This may occur via interrupt power controller 20, power management unit 11, or through localized power management circuitry in the various agents themselves.

Figure 2:
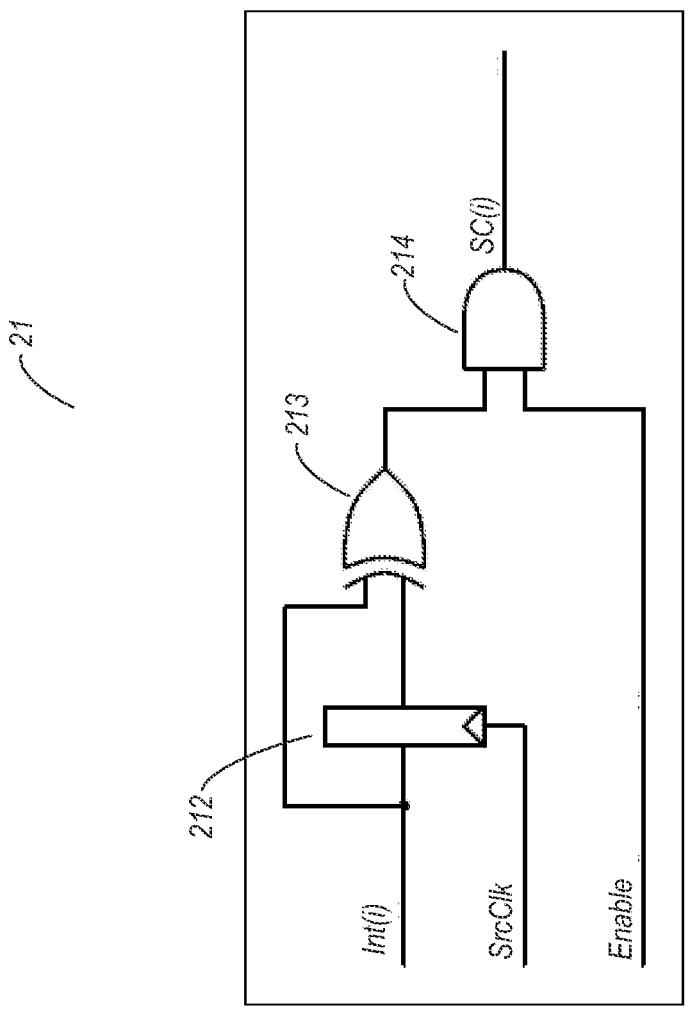
FIG. 2 is a logic diagram of one embodiment of a circuit for indicating an update to an interrupt status of a functional unit configured to request interrupts.

Moving now to FIG. 2, a logic diagram of one embodiment of status change circuit 21 is shown. In the embodiment shown, status change circuit 21 is configured to receive three different input signals—an interrupt request ('Int(i)'), a source clock signal ('SrcClk'), and an enable signal ('Enable'). The input Int(i), corresponds to an interrupt request from its corresponding functional unit 18. When the interrupt request is asserted, exclusive-OR (XOR) gate 213 receives the interrupt request on one of its inputs. The interrupt request is also received at an input of flop circuit 212 (which may be a latch, a master-slave flip-flop, or other clocked circuit). When the source clock transitions to an active state (e.g., high), flop circuit 212 conveys the signal to the other input of XOR gate 213. During the time prior to the interrupt request signal being passed through flop circuit 212, the inputs on XOR gate 213 are different. Accordingly, XOR gate 213 will output a pulse to one of the inputs of AND gate 214. The pulse may have a duration of no more than a single clock cycle in this embodiment, since the inputs to XOR gate 213 become the same no more than one clock cycle subsequent to a change of state of the interrupt request signal.

If the enable signal is asserted to the other input of AND gate 214, the assertion of a pulse on the output of XOR gate 213 may thus propagate through the former gate, thereby resulting in a pulse on the status change output ('SC(i)') of status change circuit 21. The enable signal may be de-asserted if it is desired to mask interrupts from the corresponding functional unit 18. When the enable signal is de-asserted, the output of AND gate 214 remains low irrespective of the state of the output of XOR gate 213.

Status change circuit 21 may also assert a status change pulse responsive to de-assertion of the interrupt request signal. As noted above, after the interrupt request signal has been asserted, the output of flop circuit 212 may transition accordingly. Thus, when the interrupt request signal is asserted and the output of flop circuit 212 are in the same state, the output of XOR gate 213 will fall low. When the interrupt request signal is de-asserted, the states of the respective inputs to XOR gate 213 are again different for up to one clock cycle. Thus, XOR gate 213 will again output a pulse. After the de-assertion of the interrupt request signal has propagated through flop circuit 212, the inputs to XOR gate 213 are once again the same, and once again its output falls low.

Figure 3:
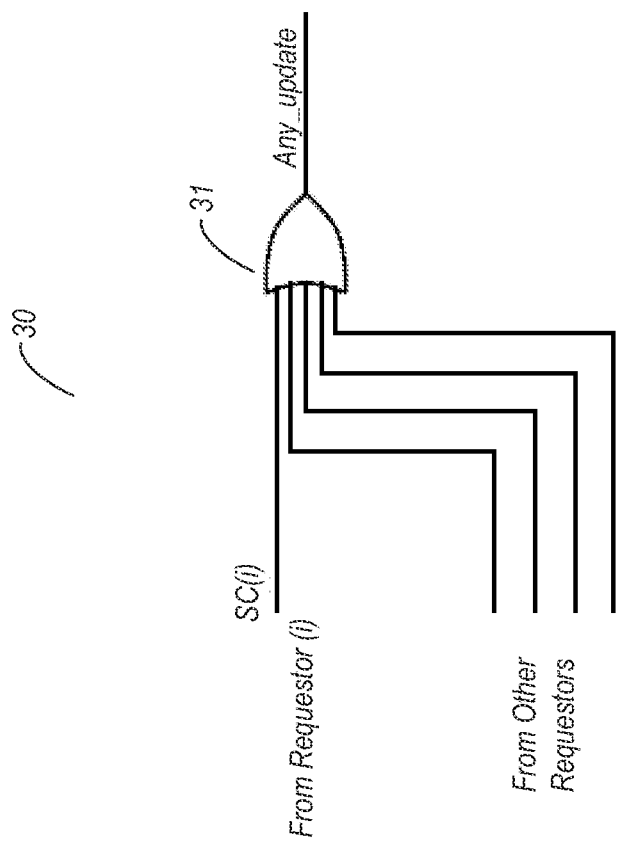
FIG. 3 is a logic diagram of one embodiment of a circuit for indicating that one or more of a number of agents has undergone a change of interrupt status.

FIG. 3 is a logic diagram of one embodiment of a circuit for indicating that one or more of a number of agents has undergone a change of interrupt status. In the embodiment shown, update circuit 30 is coupled to receive as inputs respective status change signals from each of a number of different status change circuits 21. These inputs are received by OR gate 31. If a pulse is received on any one of the inputs, the update signal ('Any_update') is output from update circuit 31. Accordingly, each time a change of interrupt status is detected at a functional unit 18, by its respective status change circuit 21, update circuit 30 may output a corresponding update pulse.

Figure 4:
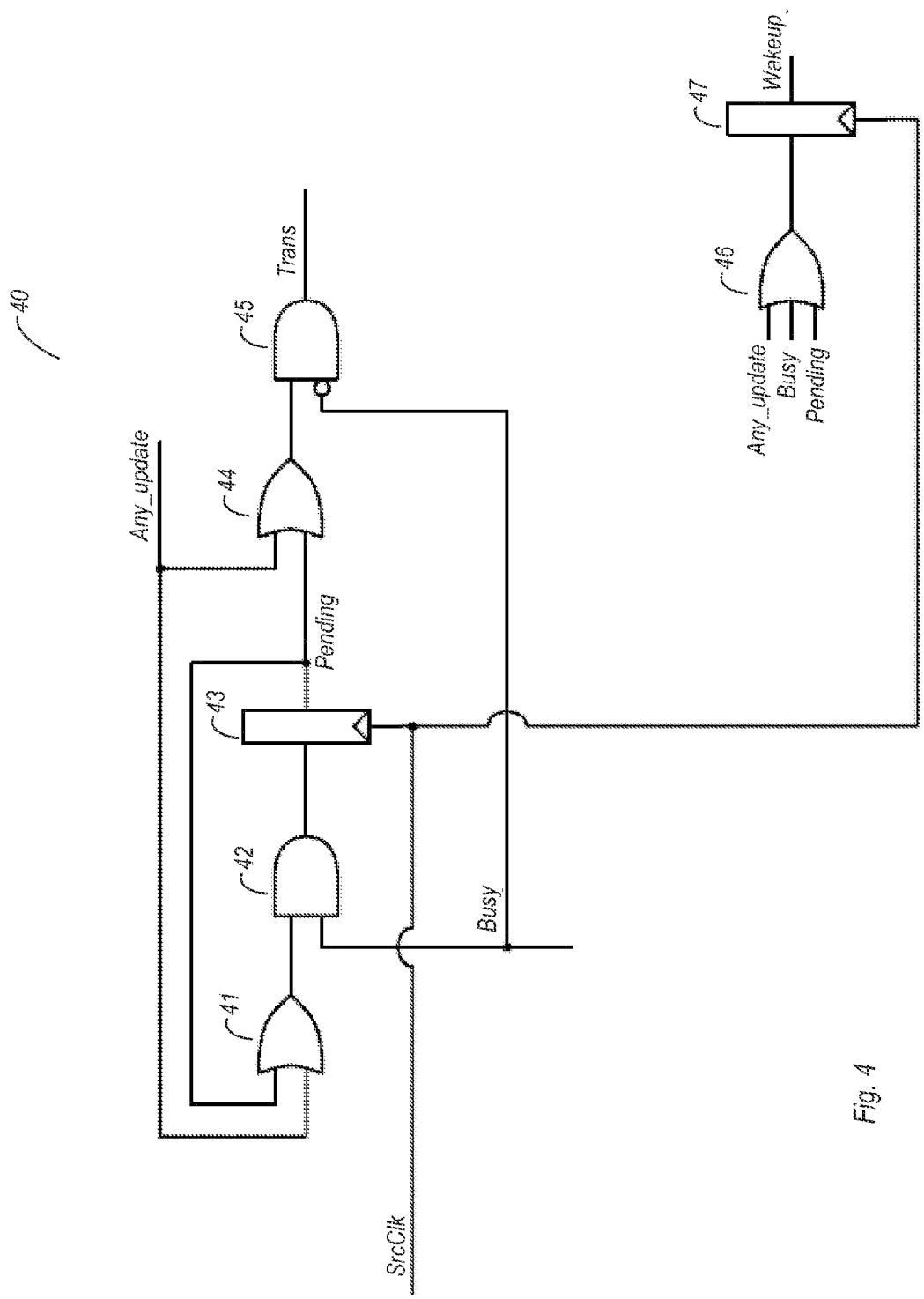
FIG. 4 is a logic diagram of one embodiment of a circuit for asserting a wakeup signal responsive to one or more interrupt requests.

FIG. 4 is a logic diagram of one embodiment of a wakeup circuit. In the embodiment shown, wakeup circuit 40 is configured to receive pulses of the update signal ('Any_update') conveyed from an update circuit 30. These pulses may be received on respective inputs of three different gates, OR gates 41, 44, and 46. When a pulse of the update signal is received on the input of OR gate 46, it may propagate through the gate to the input of flop 47. On the next active cycle of the source clock, the wakeup signal is asserted. Generally speaking, the wakeup signal is asserted (or remains asserted) on the next active clock cycle after any of the signals ('Any_update', 'Busy', or 'Pending') input to OR gate 46 is asserted.

The pulse of the update signal may also propagate through OR gate 44 to one of the inputs of AND gate 45. If the busy ('Busy') signal is low on the other input to AND gate 45, the 'Trans' signal is asserted and provided to a handshake circuit that is discussed further below. The handshake circuit may respond by asserting the busy signal, driving it high and thus causing de-assertion of the 'Trans' signal from the output of AND gate 45. When the busy signal is asserted, a pulse on either input to OR gate 41 may propagate through and cause the output of AND gate 42 to transition high. This in turn may cause the pending signal ('Pending') to be set on the next active cycle of the source clock signal. The pending signal may remain asserted at least until the next clock cycle following the high-to-low transition of the busy signal.

Figure 5:
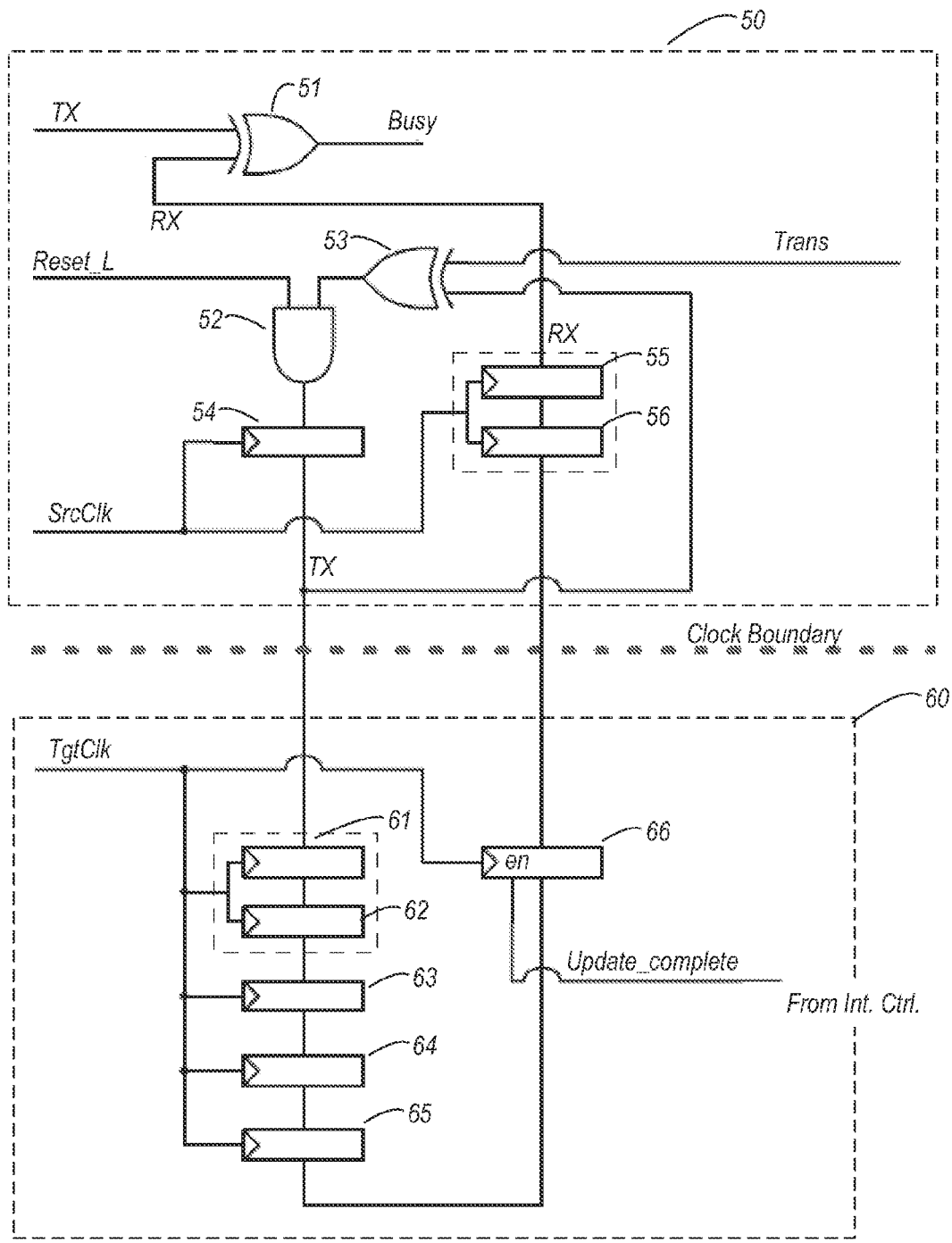
FIG. 5 includes logic diagrams of one embodiment of a handshake circuit and one embodiment of a synchronization circuit.

FIG. 5 includes logic diagrams of one embodiment of a handshake circuit and one embodiment of a synchronization circuit. In the embodiment shown, handshake circuit 50 is coupled to receive the 'Trans' signal on one input of XOR gate 53. If the other input, TX, is low, a high on the 'Trans' input causes XOR gate 53 to output a high. The reset signal ('Reset_L'), is active low, and thus is high when the circuit is not in a reset state. Accordingly, when both the reset signal and the output of XOR gate 53 are high, and thus AND gate 52 outputs a high. On the next active cycle of the source clock signal, flop circuit 54 outputs the TX signal as a high. The TX signal is driven to an input of XOR gate 53, an input of XOR get 51, and to synchronization circuit 60.

When the TX signal is driven high while RX remains low, the output of XOR gate 51 transitions high, thereby asserting the busy signal. The TX signal is also fed into a chain of flop circuits 61-65 of synchronization circuit 50. It is noted that in this particular embodiment, when the TX signal is conveyed to flop 61, it crosses a clock boundary, as flop circuits 61-66 are all synchronized to the target clock ('TgtClk') signal. However, embodiments of the circuits disclosed herein in which all the circuits are in the same clock domain are possible and contemplated.

The TX signal is advanced from one of flops 61-65 to the next flop in the chain on successive cycles of the target clock signal. However, the TX signal is not conveyed through flop 66 until servicing of the interrupt is complete. Servicing as defined herein may include communicating the interrupt over a communications path (e.g., a communications fabric) to the interrupt controller 14. The completion of servicing of a current interrupt is indicated by interrupt controller 14 via assertion of the completion signal ('Update_complete'), which may indicate that the interrupt controller 14 has at least acknowledged receipt of the interrupt request. Interrupt controller 14 may hold the update completion signal de-asserted any time it is servicing an interrupt. When the servicing of that interrupt is complete, the completion signal may be asserted for at least one cycle of the target clock signal. If no further interrupts are pending or otherwise being serviced, the completion signal may remain asserted.

The completion signal is received by synchronization circuit 60 on an enable signal of flop 66. If the completion signal is de-asserted, the TX signal is inhibited from advancing irrespective of the target clock signal. Once the completion signal is asserted, the TX signal is received into and conveyed from flop circuit 66 on the next active (e.g., high) cycle of the target clock signal. The TX signal is then conveyed back across the clock boundary into the source clock domain, where it is received by flop 56. On successive active cycles of the source clock signal, the TX signal is conveyed from flop 56 to flop 55, and then from flop 55 to an input of XOR gate 51 as the RX signal (i.e. the output of flop circuit 55 is the RX signal). If the TX signal is high when the RX signal is input as high to XOR gate 51, the inputs match and thus the busy signal falls low. When a low busy signal is conveyed back to wakeup circuit 40, the output of AND gate 42 thereof falls low, while the output of AND gate 45, 'Trans', will follow the output of OR gate 44.

When the TX signal is initially driven high via AND gate 52 and flop circuit 54, it is also fed back as an input into XOR gate 53. When the 'Trans' signal is high, the high on the TX signal causes the inputs of XOR gate 53 to match and thus its output falls low. This low is then propagated from AND gate 52 through flop circuit 54, and into synchronization circuit 60. This low then propagates through synchronization circuit 60, back to handshake circuit 50 and output to the corresponding input of XOR gate 51 as the RX signal. Since the TX signal will have fallen low by this time, the low on the RX signal will cause the output of XOR gate 51 to also fall low, thereby de-asserting the busy signal. Thereafter, the busy signal may remain de-asserted until another pulse of the update signal sets in motion the chain of events described above.

Figure 6:
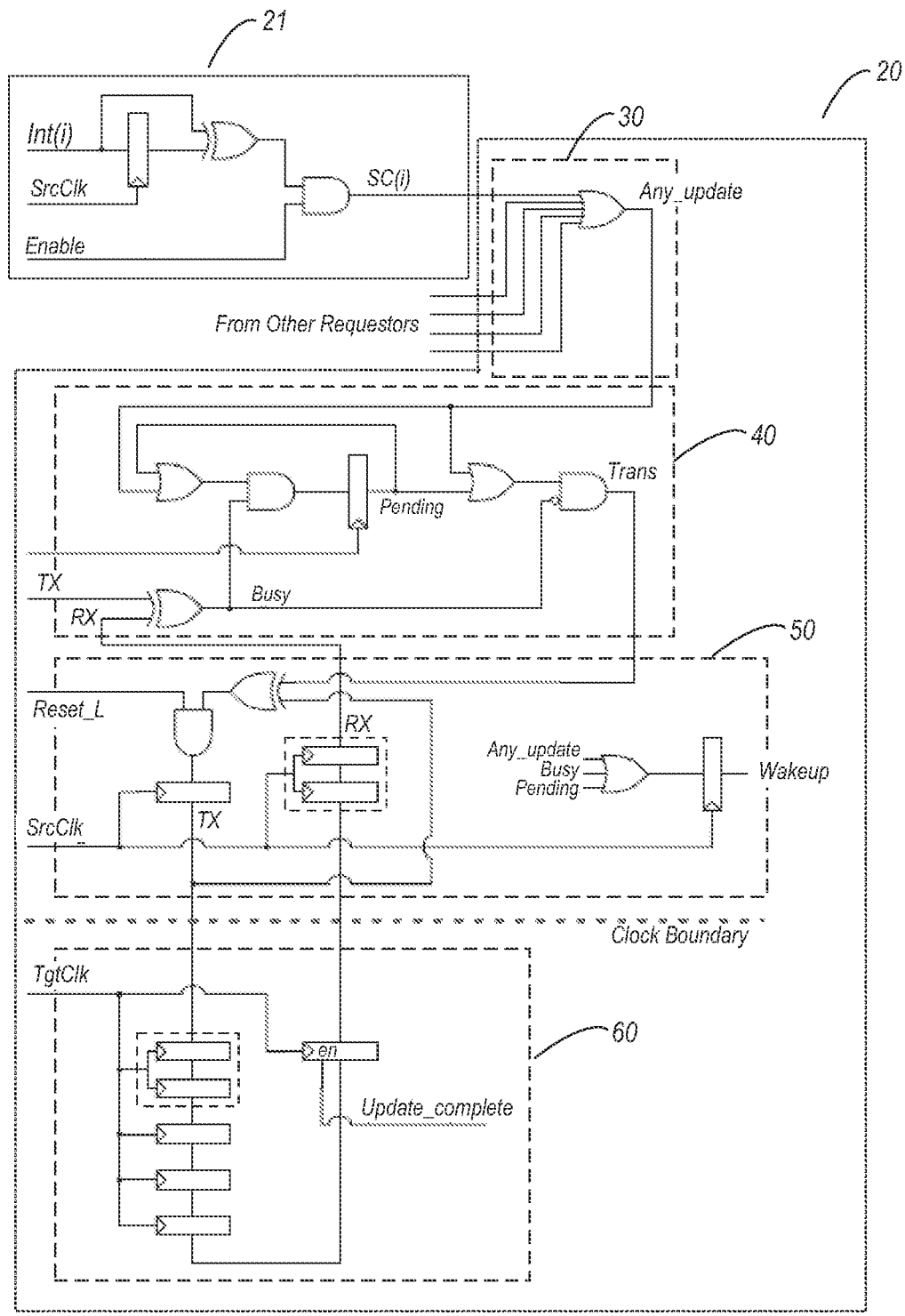
FIG. 6 is a logic diagram illustrating a composite of the circuit embodiments shown in FIGS. 2-5.

FIG. 6 is a logic diagram illustrating a composite of the circuits illustrated in FIGS. 2-5. More particularly, FIG. 6 illustrates one instance of an update circuit 21 coupled to the interrupt power controller 20, which includes update circuit 30, wakeup circuit 40, handshake circuit 50, and synchronization circuit 60. Assertion of an interrupt request by any requestor, when its interrupt capability is not masked, may cause the various events described above to occur and also cause assertion of the wakeup signal. The wakeup signal may remain asserted until at least a time after which servicing of a current interrupt is complete. Once the wakeup signal has been de-asserted, it is no longer requesting interrupt controller 14 to be in an active state. De-assertion of the wakeup signal may be a necessary (but not necessarily sufficient) condition for placing interrupt controller 14 in a low power state during normal operation. Some exceptions to this may exist, such as conditions that result in an emergency shutdown of processor 12, to use one example.

Figure 7:
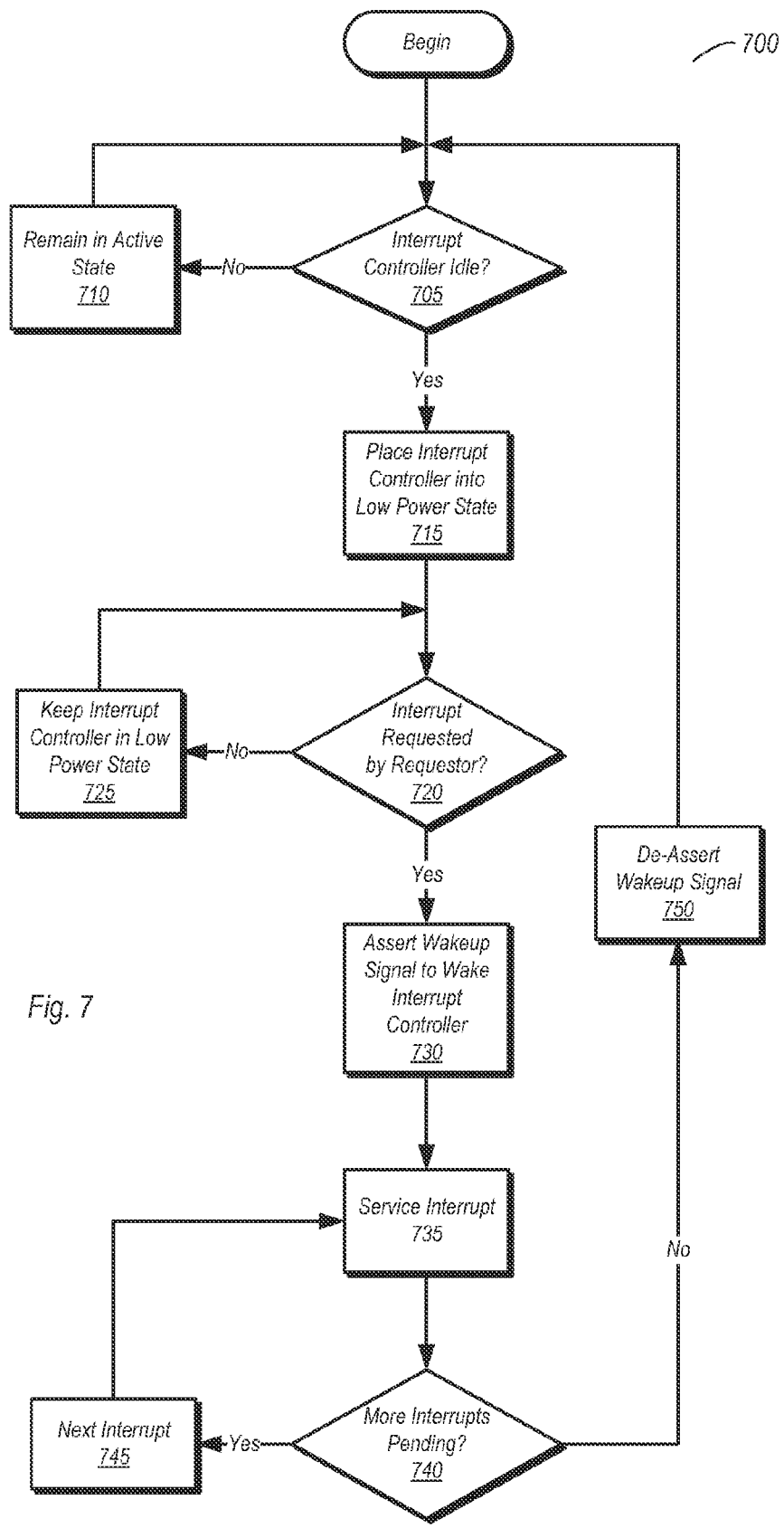
FIG. 7 is a flow diagram of one embodiment for operating an integrated circuit.

FIG. 7 is a flow diagram of one embodiment of a method for operating an integrated circuit implementing interrupt based power state management. Method 700 may be implemented using various embodiments of the circuits described above, and on various embodiments of the system described with respect to FIG. 1. However, method 700 is not limited by the various circuit and system embodiments described herein. On the contrary, other circuits and systems which implement method 700 are possible and contemplated.

Method 700 begins with a determination of whether the interrupt controller is idle (block 705). If the interrupt controller is not idle (block 705, no), then it remains in an active state (block 710). If the interrupt controller is idle (e.g., a predetermined amount of time with no activity; block 705, yes), then it may be placed into a low power state (block 715). The low power state may comprise clock gating, power gating, or both.

If no interrupts are requested by any requestor (e.g., a unit capable of requesting interrupts) while the interrupt controller is idle (block 720, no), then the interrupt controller may remain in a low power state (block 725). If an interrupt is requested while the interrupt controller is in a low power state (block 720, yes), a wakeup signal may be asserted to cause the interrupt controller to exit the low power state (block 730). The wakeup signal may be asserted by an interrupt power controller such as that described above, or by another type of circuit/unit.

After the interrupt controller has been awakened, the interrupt may be serviced (block 735). If there are more pending interrupts (i.e. interrupt requests that have not been serviced; block 740, yes), then the interrupt controller proceeds to the next interrupt request (block 745) and performs the desired service (block 735). If there are no further interrupt requests to be serviced at that time (block 740, no), then the wakeup signal is de-asserted (block 750), and the method returns to block 705.

Figure 8:
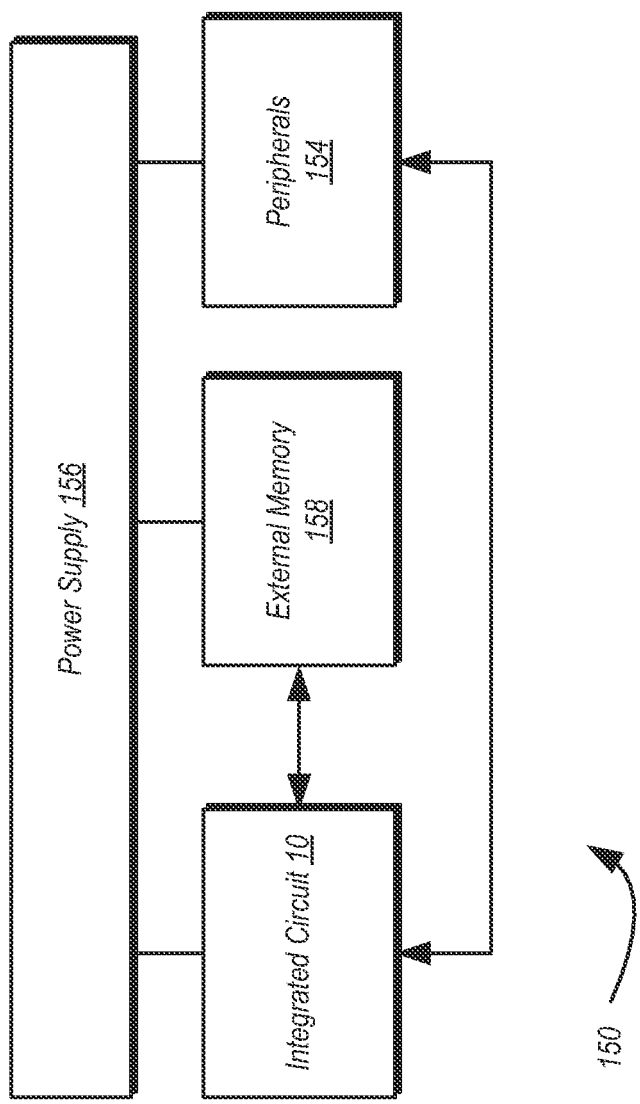
FIG. 8 is a block diagram of one embodiment of an exemplary system.

Turning next to FIG. 8, a block diagram of one embodiment of a system 150 is shown. In the illustrated embodiment, the system 150 includes at least one instance of the integrated circuit 10 coupled to external memory 158. The integrated circuit 10 is coupled to one or more peripherals 154 and the external memory 158. A power supply 156 is also provided which supplies the supply voltages to the integrated circuit 10 as well as one or more supply voltages to the memory 158 and/or the peripherals 154. In some embodiments, more than one instance of the integrated circuit 10 may be included (and more than one external memory 158 may be included as well). System 150 may be an embodiment of system 5 shown in FIG. 1, which integrated circuit 10 being one embodiment of processor 12. In another embodiment, integrated circuit 10 may encompass power management unit 11, power control unit 20, and one or more of functional units 18. In some embodiments, various ones of the functional units 18 may be encompassed by peripherals 154. Embodiments wherein at least one of functional units 18 is implemented on the same integrated circuit as processor 12 while at least one other one of functional units 18 is implemented separately from the aforementioned integrated circuit are also possible and contemplated.

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as WiFi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 158 may include any type of memory. For example, the external memory 158 may be SRAM, dynamic RAM (DRAM) such as synchronous DRAM (SDRAM), double data rate (DDR, DDR2, DDR3, LPDDR1, LPDDR2, etc.) SDRAM, RAMBUS DRAM, etc. The external memory 158 may include one or more memory modules to which the memory devices are mounted, such as single inline memory modules (SIMMs), dual inline memory modules (DIMMs), etc.

Numerous variations and modifications will become apparent to those skilled in the art once the above disclosure is fully appreciated. It is intended that the following claims be interpreted to embrace all such variations and modifications.

What is claimed is:

1. An apparatus comprising:
one or more agents configured to assert respective interrupt requests, wherein each of the one or more agents includes a respective state change circuit configured to detect a change in an interrupt status of its respective agent and assert, for a duration of a single clock cycle, a state change pulse responsive to detecting a change in the interrupt status of its respective agent;

an interrupt controller configured to receive and process the interrupt requests, wherein the interrupt controller is configured to enter a low power state when inactive; and an interrupt power controller including a handshake circuit and a synchronization circuit, the interrupt power controller coupled to receive interrupt request indications from each of the one or more agents, wherein the interrupt power controller is configured to assert a wakeup signal to the interrupt controller responsive to one of the one or more agents asserting an interrupt, wherein the interrupt controller is configured to exit the low power state responsive to receiving the wakeup signal;

wherein:

the handshake circuit is configured to transmit a first indication to the synchronization circuit responsive to the interrupt power controller detecting assertion of an interrupt request;

the synchronization circuit is configured to transmit a second indication to the handshake circuit responsive to completion of servicing of an interrupt associated with the interrupt request; and the handshake circuit is configured to assert a busy signal indicating that an interrupt is being serviced when the first and second indications have different logic states with respect to one another.

2. The apparatus as recited in claim 1, wherein the interrupt power controller includes an update circuit configured to assert an update signal responsive to receiving a state change pulse from the state change circuit of any of the one or more agents.

3. The apparatus as recited in claim 2, wherein the interrupt power controller includes a wakeup circuit coupled to receive the update signal from the update circuit, wherein the wakeup circuit is configured to assert a wakeup signal responsive to assertion of the update signal.

4. The apparatus as recited in claim 3, wherein the wakeup circuit is configured to hold the wakeup signal in an asserted state if a current interrupt is being serviced or if another un-serviced interrupt is pending.

5. The apparatus as recited in claim 4, wherein the handshake circuit is configured to assert a busy signal responsive to assertion of the update signal, and further configured to hold the busy signal asserted until at least a time that an interrupt that triggered assertion of the update signal has been serviced.

6. The apparatus as recited in claim 5, wherein the second indication indicates that servicing of the first interrupt is complete.

7. The apparatus as recited in claim 6, wherein the handshake circuit is in a first clock domain and coupled to receive a first clock signal, and wherein the synchronization circuit is in a second clock domain and coupled to receive a second clock signal.

8. The apparatus as recited in claim 1, wherein each state change circuit includes an enable input, wherein each state change circuit is configured to inhibit its respective state change pulse from being asserted when an enable signal received on its respective enable input is not asserted.

9. A method comprising:

placing an interrupt controller in a low power state responsive to determining that the interrupt controller is inactive;

asserting an interrupt request, said asserting performed by one of one or more agents;

receiving an indication of the interrupt request at an interrupt power controller;

asserting, at the interrupt power controller, a wakeup signal responsive to receiving the indication of the interrupt request;

a handshake circuit in the interrupt power controller providing, to a synchronization circuit, a first indication responsive to assertion of the interrupt request;

causing the interrupt controller to exit the low power state responsive to assertion of the wakeup signal;

detecting a change in an interrupt state of the one or more agents; and asserting, for a single clock cycle, a state change pulse responsive to said detecting and wherein said detecting and said asserting are performed by a state change circuit associated with the one of the one or more agents;

asserting, from the handshake circuit, a busy signal indicating that the interrupt request is being serviced;

de-asserting the busy signal responsive to receiving, at the handshake circuit, a second indication from the synchronization circuit; and the interrupt controller re-entering the low power state responsive to de-asserting the busy signal if no other interrupt requests are currently pending.

10. The method as recited in claim 9, further comprising an update circuit asserting an update signal responsive to receiving the state change pulse from the one of the one or more agents, wherein the update circuit is configured to assert the update signal responsive to receiving a respective state change pulse from any of the one or more agents, wherein the interrupt power controller includes the update circuit.

11. The method as recited in claim 10, further comprising:

receiving the update signal;

asserting a wakeup signal responsive to receiving the update signal; and holding the wakeup signal asserted until at least a time subsequent to servicing the interrupt;

wherein said receiving, said asserting, and said holding are performed by a wakeup circuit, wherein the interrupt power controller includes the wakeup circuit.

12. The method as recited in claim 9, wherein each of the agents is associated with a corresponding state change circuit, and wherein the method further comprises:

de-asserting an enable signal.

13. A system comprising:

a plurality of requestors, wherein each of the requestors is configured to assert an interrupt request;

an interrupt control circuit configured to process an interrupt responsive to assertion of an interrupt request by one of the plurality of requestors, wherein the interrupt control circuit is configured to enter a low power state when idle; and an interrupt power control circuit coupled to each of the plurality of requestors, wherein the interrupt power control circuit is configured to assert a wakeup signal responsive to one of the plurality of requestors asserting an interrupt request, wherein the interrupt control circuit is configured to exit the low power state responsive to receiving the wakeup signal;

wherein the interrupt power control circuit includes a handshake circuit and a synchronization circuit, wherein the handshake circuit is configured to transmit a first indication to the synchronization circuit responsive to the interrupt power control circuit detecting assertion of an interrupt request, and wherein the synchronization circuit is configured to transmit a second indication to the handshake circuit responsive to completion of servicing of an interrupt associated with the interrupt request.

14. The system as recited in claim 13, wherein each of the plurality of requestors is associated with a corresponding one of a plurality of state change circuits configured to detect a change of interrupt state of its respective agent, and further configured to assert a state change pulse for a clock cycle responsive to detecting a change of interrupt state for its respective agent.

15. The system as recited in claim 14, wherein each of the plurality of state change circuits is coupled to receive a corresponding one of a plurality of enable signals, and wherein a given one of the plurality of state change circuits is configured to inhibit assertion of a corresponding state change pulse responsive to de-assertion of its corresponding one of the plurality of enable signals.

16. The system as recited in claim 13, wherein the interrupt power control circuit is configured to hold the wakeup signal asserted if an interrupt asserted by any one of the plurality of requestors has not completed servicing by the interrupt control circuit.

17. The system as recited in claim 13, wherein the handshake circuit is configured to operate according to a first clock signal in a first clock domain, and wherein the synchronizer circuit is configured to operate according to a second clock signal in a second clock domain.

* * * * *